Dec. 16, 1958  H. E. GLODDE  2,864,444
TIRE CASING CONDITIONING MEANS
Filed Oct. 28, 1955  6 Sheets-Sheet 1
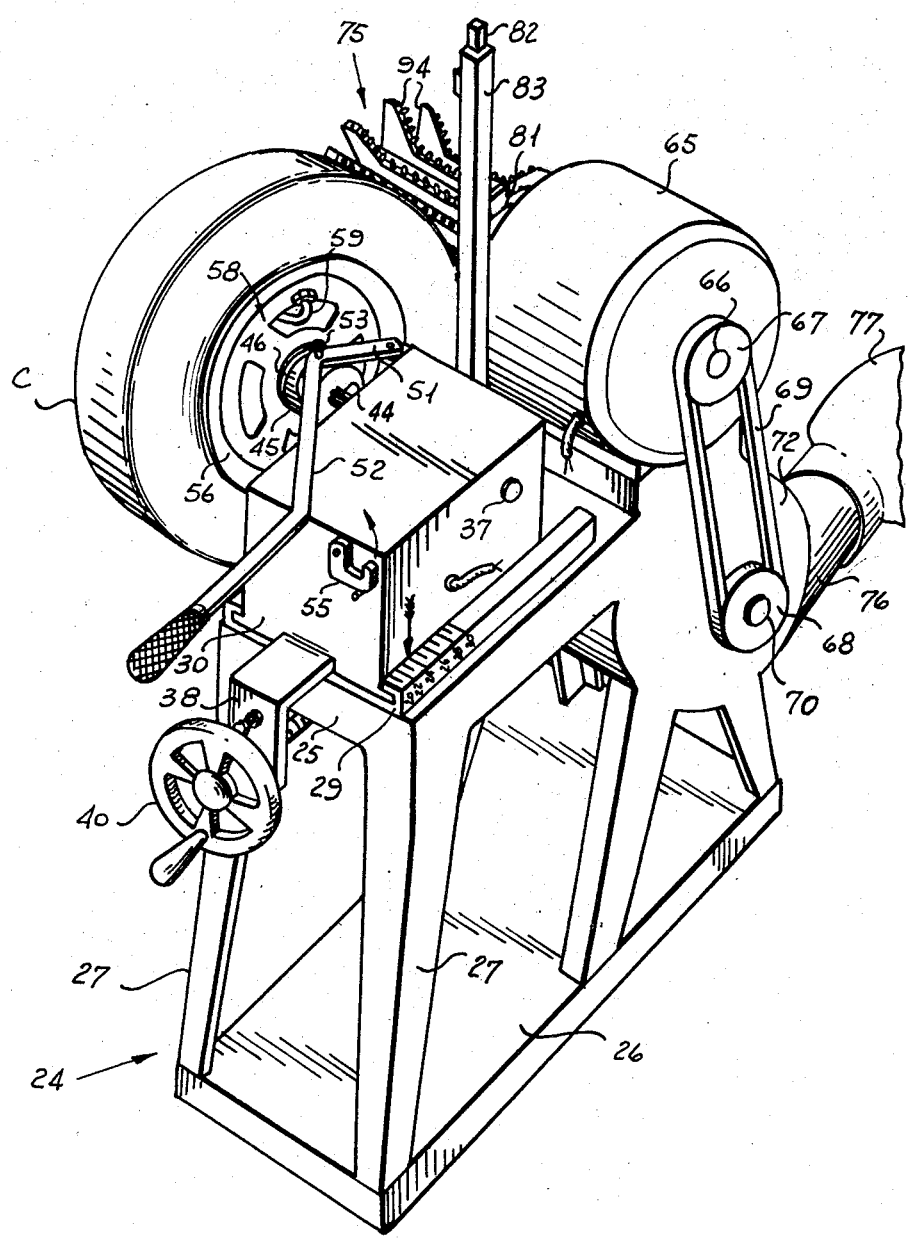
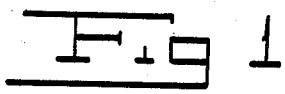
INVENTOR
HERMAN E. GLODDE
BY
Robert F. Beck
ATTORNEY

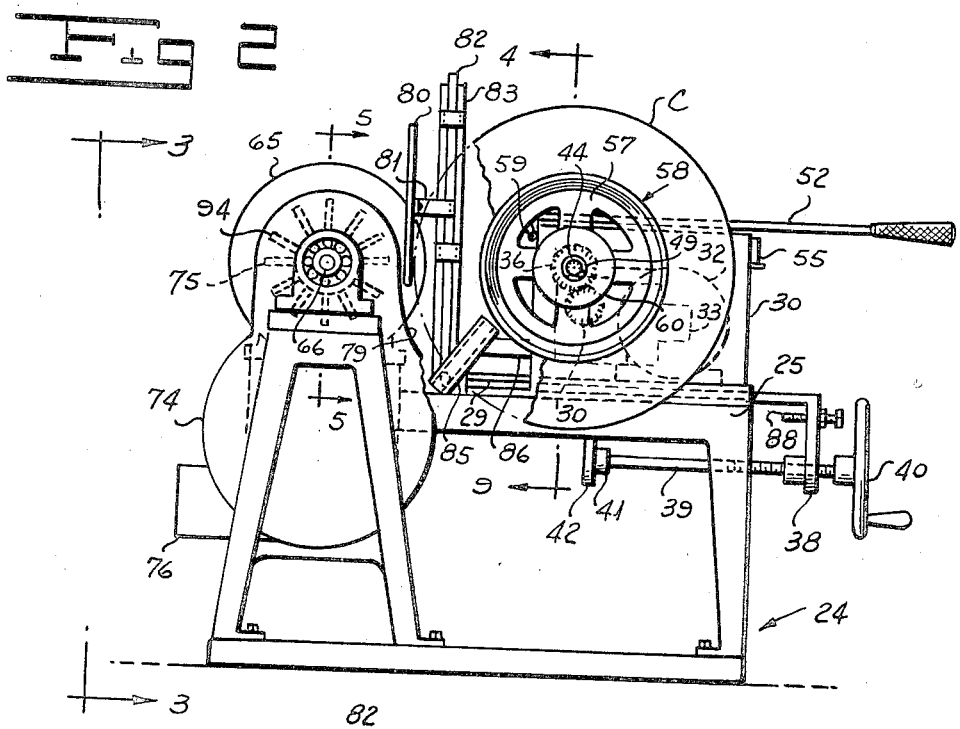

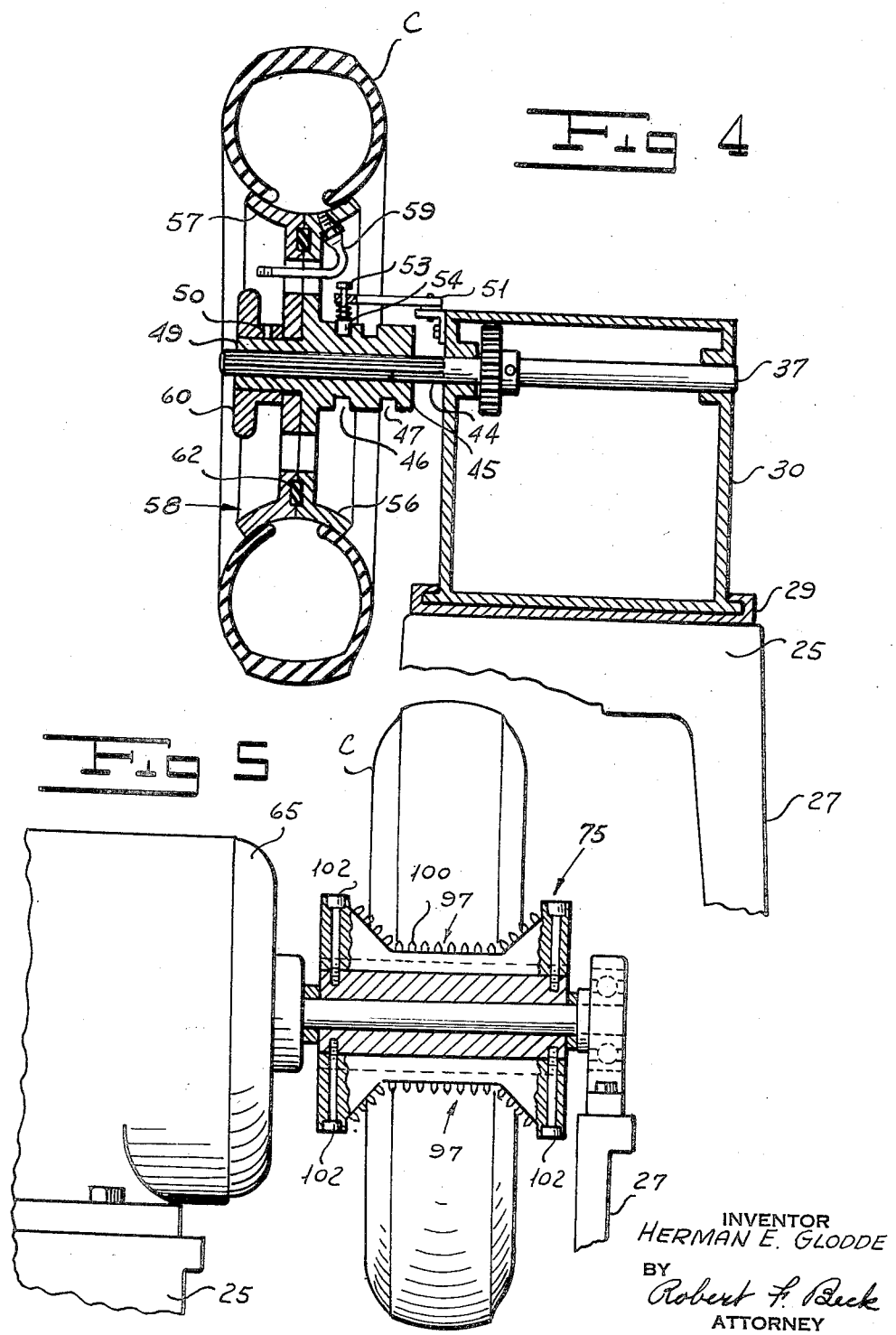

Dec. 16, 1958  H. E. GLODDE  2,864,444
TIRE CASING CONDITIONING MEANS
Filed Oct. 28, 1955  6 Sheets-Sheet 4
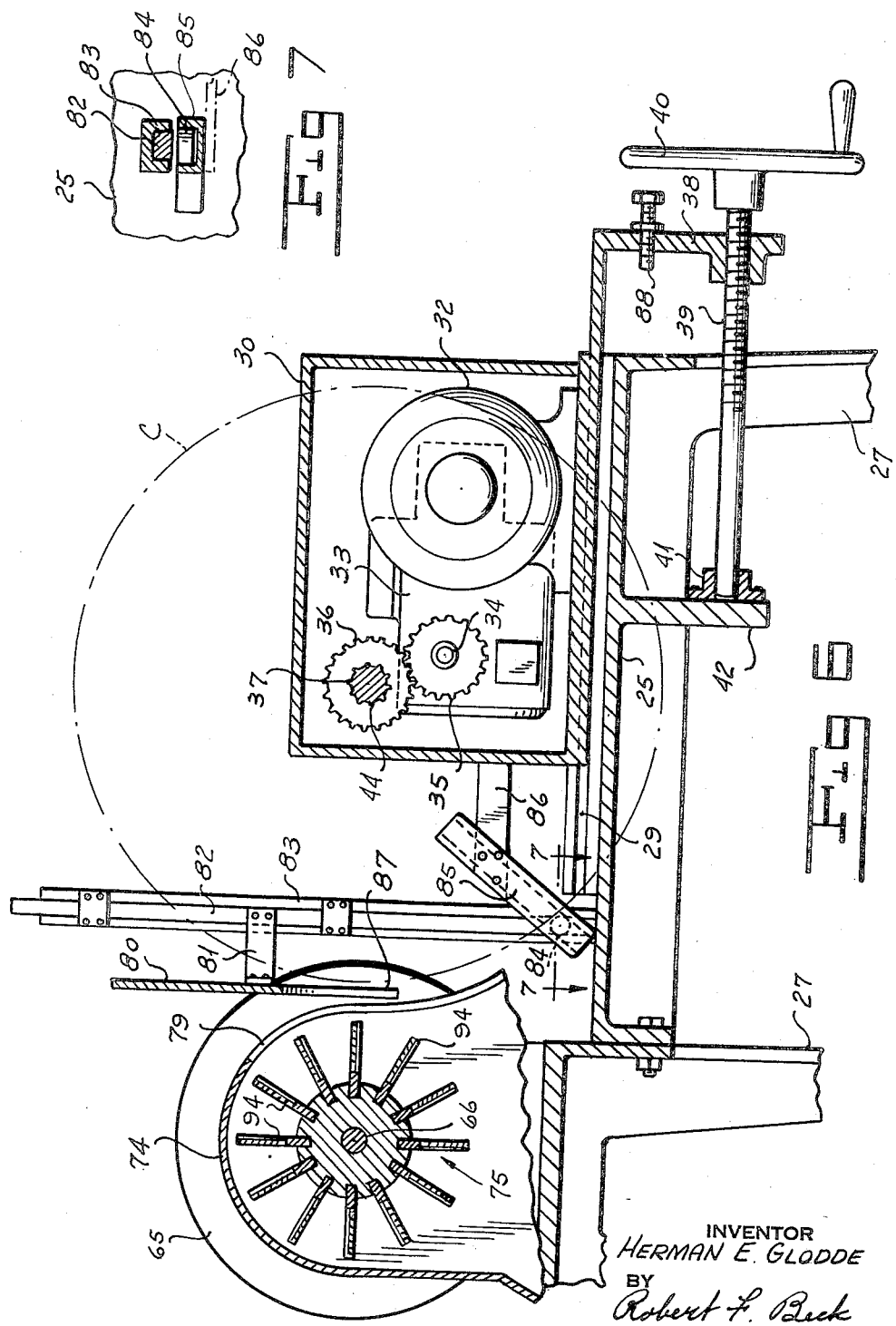
INVENTOR
HERMAN E. GLODDE
BY
Robert F. Beck
ATTORNEY Dec. 16, 1958     H. E. GLODDE     2,864,444
TIRE CASING CONDITIONING MEANS
Filed Oct. 28, 1955     6 Sheets-Sheet 5
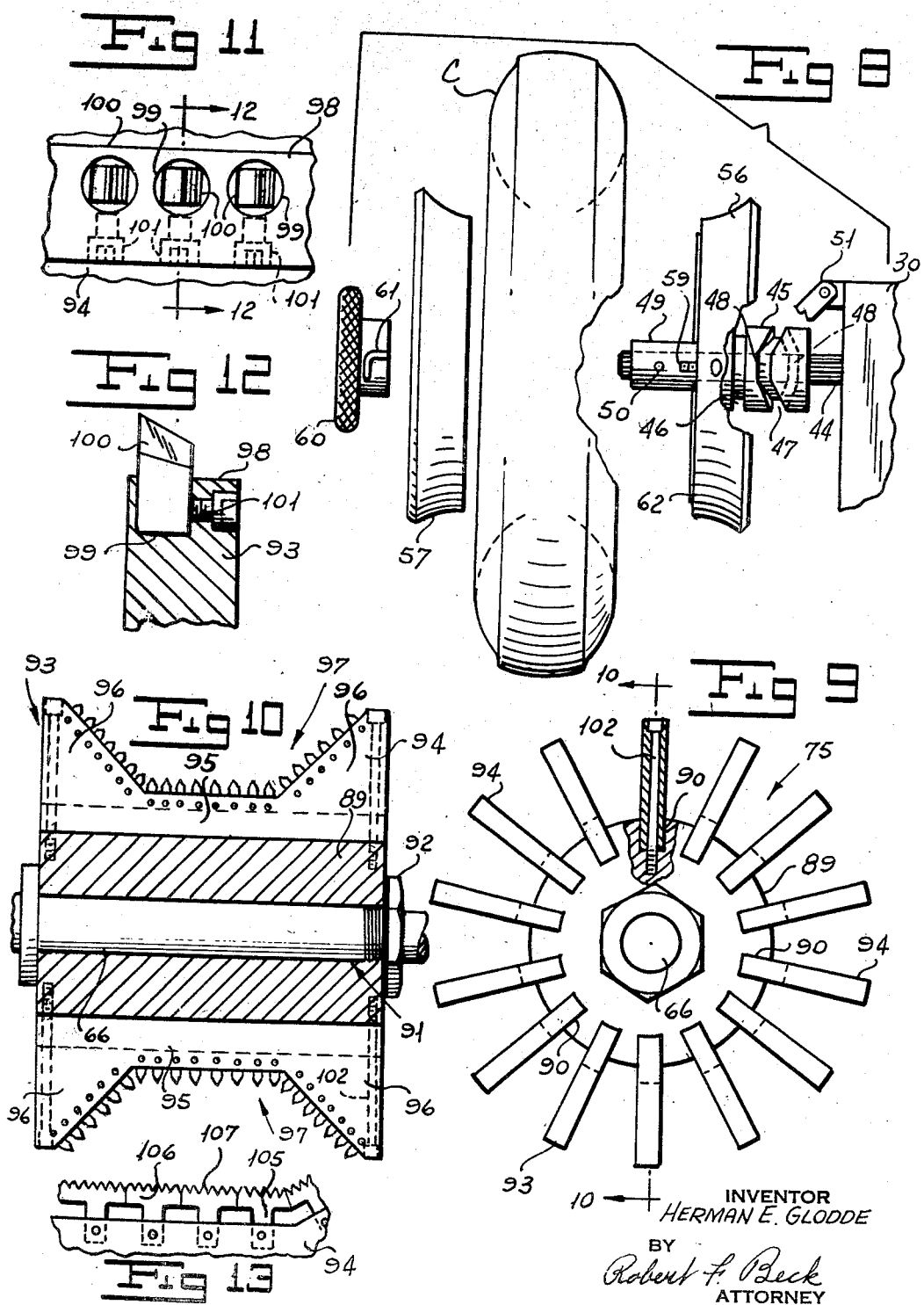
INVENTOR
HERMAN E. GLODDE
BY
Robert F. Beck
ATTORNEY Dec. 16, 1958     H. E. GLODDE     2,864,444
TIRE CASING CONDITIONING MEANS
Filed Oct. 28, 1955     6 Sheets-Sheet 6
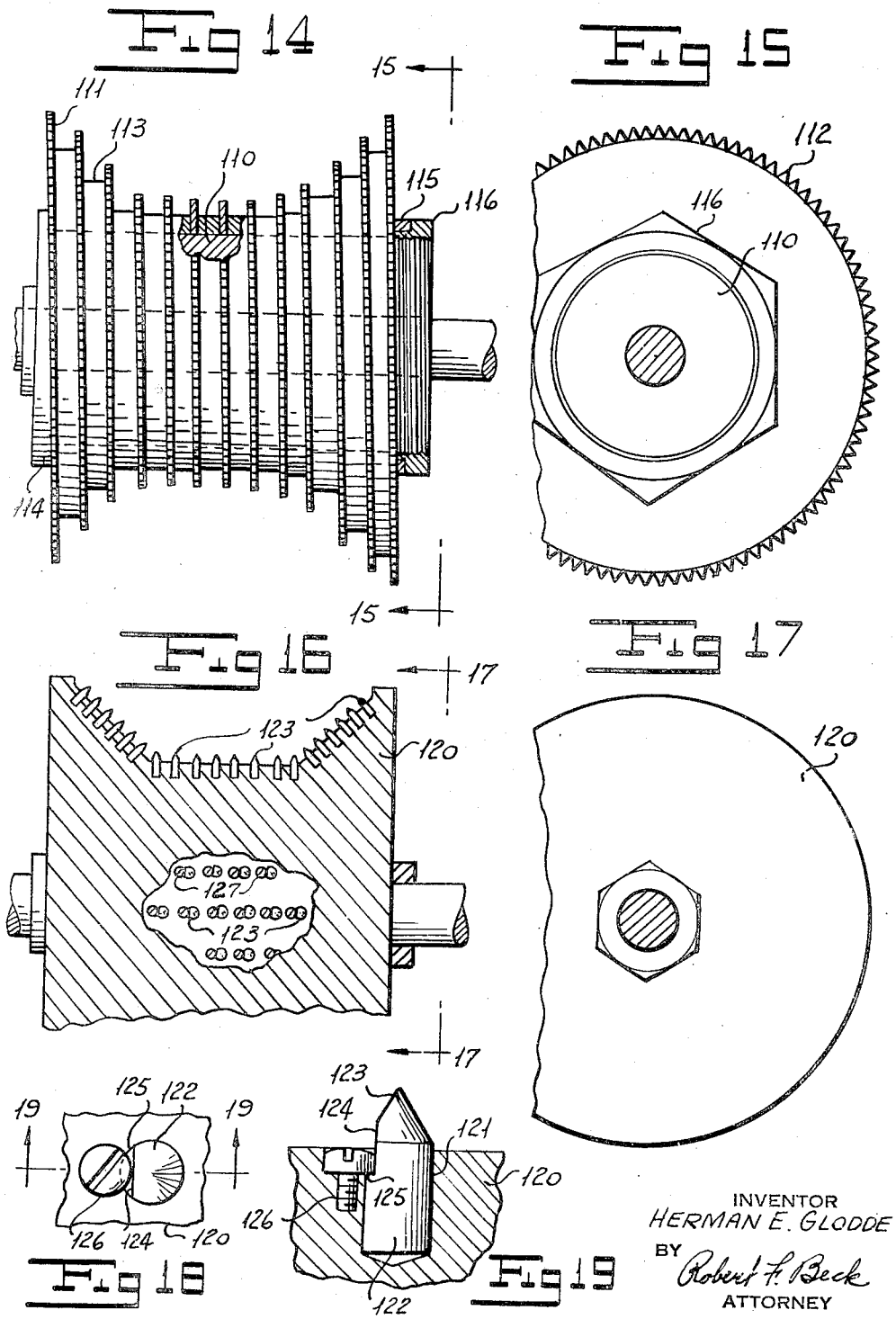
INVENTOR
HERMAN E. GLODDE
BY
Robert F. Beck
ATTORNEY

United States Patent Office 2,864,444
Patented Dec. 16, 1958

2,864,444

TIRE CASING CONDITIONING MEANS

Herman E. Glodde, Franklin Lakes, N. J.

Application October 28, 1955, Serial No. 543,537

7 Claims. (Cl. 164—10.2)

My invention relates to the retreading of tires and more particularly to means for effecting the removal of old treads from and conditioning of tire casings or carcasses for receiving new treads.

One of the objects of my invention is to provide means for conditioning tire casings for retreading.

Another object of my invention is to provide an apparatus equipped with tread removing means for removing worn treads from tire casings together with actuating means for effecting feeding movement of the casing relative to the tread removing means.

A further object of my invention is to provide an apparatus of the foregoing described character equipped with means to effect relative lateral shifting of the casings relative to the tread removing means, whereby, to shape the casings to conform to a pre-established transverse contour.

A still further object of my invention is to provide an apparatus of the foregoing described character equipped with means for automatically shifting the casing laterally with respect to the tread removing means.

A still further object of my invention is to provide an apparatus of the foregoing described character equipped with means operable to facilitate mounting and demounting of the tire casing relative to the apparatus.

A special object of my invention is to provide an apparatus of the foregoing described character equipped with means for protecting the operator from injury during certain operational phases of the apparatus.

An important object of my invention is to provide tread removing means in the form of a head or tool having shredding teeth which may be readily replaced when worn.

Another important object of my invention is to provide an apparatus of the foregoing described character which is simple in construction, durable in use, efficient in operation and economical in manufacture.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a perspective view of my invention.

Figure 2 is a side elevation thereof.

Figure 3 is an end elevation, partly in section, of the invention.

Figure 4 is a detail sectional view taken on the line 4—4 of Figure 2.

Figure 5 is a transverse sectional view taken on the line 5—5 of Figure 2.

Figure 6 is an enlarged detail longitudinal sectional view.

Figure 7 is a detail sectional view taken on the line 7—7 of Figure 6.

Figure 8 is a disassembled side elevation of the tire casing mounting means.

Figure 9 is an end elevation of the tread removing or shredding head, rasp or tool.

Figure 10 is a sectional view taken on the line 10—10 of Figure 9.

Figure 11 is a fragmentary plan view of the tool.

Figure 12 is a detail sectional view taken on the line 12—12 of Figure 11.

Figure 13 is a fragmentary elevation of a modified form of tool.

Figure 14 is a side elevation of another modified form of tool.

Figure 15 is a sectional view taken on the line 15—15 of Figure 14.

Figure 16 is a fragmentary side elevation, partly in section, of a further modification of the tool.

Figure 17 is a detail sectional view taken on the line 17—17 of Figure 16.

Figure 18 is a fragmentary plan view of the tool disclosed in Figure 16.

Figure 19 is a detail sectional view taken on the line 19—19 of Figure 18.

In practicing my invention, as illustrated in Figures 1 to 12, inclusive, of the drawings, I provide a mounting frame 24 comprising a bed 25 disposed in spaced relation above a base 26 and connected thereto by suitable legs or uprights 27. The bed 25 is equipped with a plate-like guide 29 on which is slidably mounted a housing 30 formed with lower longitudinally extending outwardly disposed ribs or flanges slidably operable within ways provided on the longitudinal margins of the guide, whereby, to guide the housing during longitudinal movement thereof relative to the bed.

The housing 30, which is of a hollow construction, has arranged therein, for movement therewith, an electric motor or power means 32 operatively connected to a speed control or gear reduction unit 33 having a drive shaft 34 on which is mounted a drive gear 35 meshing with a driven gear 36 fixed to a splined driven jack shaft 37 on which the tire casing C is mounted as hereinafter more fully disclosed. The rear end of the housing 30 has extending therefrom an L-shaped bracket 38 through which is threaded a feed screw 39 or the like equipped at one end with a hand-wheel 40. The other end of the screw 39 is pivotally connected, as at 41, to a depending arm 42 fixed to the bottom of the bed 25, whereby, upon rotation of the screw 39, the housing 30 is moved longitudinally relative to the bed 25 for a purpose hereinafter made apparent. The shaft 37 is journaled through the housing and has a splined end section 44 disposed outside of the housing and on which is slidably mounted a cam or cylindrical member 45 formed on one side of its peripheral face with a circumferentially extending slot 46 and on its other side with a cam slot 47 provided with oppositely disposed dwells 48, one end of the member 45 being formed with a diametrically reduced sleeve 49 provided with a radially extending locking pin 50.

A front upper corner of the housing 30 has pivotally connected thereto one end 51 of a lever 52, the opposite end of which is provided with a handle. Adjacent the end 51, the lever is equipped with a spring-pressed pin 53 on which is rotatably mounted a roller 54 disposed within one of the slots 45 or 46 of the member 45. By raising the pin 53 against the tension of its spring the roller may be selectively disposed within either of the slots upon manipulation of the lever and release of the pin. A latch-keeper 55 is pivoted on the housing and is utilized for latching the lever 52 in position to maintain the roller 54 in the slot 47 for a purpose hereinafter set forth.

Laterally of the housing 30, I provide a tire mounting device or means comprising a pair of separable inner and outer sections 56 and 57, respectively, having rim portions coacting together to constitute a rim 58 on which the tire casing C is mounted. For supplying air to the tire casing C, an air inlet connection 59 is threaded into the rim portion of the inner section 56 and which connection is provided with the usual check valve. The inner section 56 is fixed to or formed integrally with the member 45 while the outer section 57 is sleeved upon the sleeve 49 and secured in fixed relation therewith and the inner section by means of a lock-collar 60, the latter being formed with a bayonet slot 61 receiving the pin 50. The inner section 56 is provided on its inner radial face with a groove in which is fixed a gasket 62 which seats within a similar groove formed in the confronting face of the outer section 57 to form a seal between the sections, whereby, when the casing C is mounted on the rim 58 air may be introduced within the casing for inflating the latter sufficiently to permit removal of the tread and treating of the tread surface.

Mounted on the front of the bed 25 is a power device or electric motor 65 provided with a drive shaft 66 having mounted on one end thereof a pulley 67 coupled to a similar pulley 68 by means of a belt 69. The pulley 68 is fixed to the driven shaft 70 of a fan 71 constituting a blower or suction device and which is mounted within a casing 72 subjacent the motor. The casing 72 is provided with an axially arranged inlet conduit 73 communicating with the lower end of a hood 74, the latter embracing a tread removing tool 75 fixed on the other end of the shaft 66. The casing 72 is provided with an outlet conduit 76 leading to a collector, for instance, a bag 77 or other detachable receptable for receiving therein waste material occasioned by the removal of the tread from the casing C by the tool 75.

The rear face of the hood 74 is provided with a slot 79 to permit the casing C to advance within the hood for engagement by the tool 75. In order to protect the operator from engagement with the tool 75 during operation of the latter and coincident with the mounting and demounting of the casing onto and from the rim 58, I provide a guard plate 80 disposed outwardly of the hood and fixed to a bracket 81 carried by a vertically extending slide 82 disposed within a guide 83. The lower end of the slide 82 has mounted thereon a roller 84 disposed within a groove formed in an actuating bar 85 disposed at an angle with respect to the slide 82 and fixed to an arm 86 carried by the front of the housing 30. Movement of the housing towards and from the hood serves to raise and lower the plate 80 through the instrumentality of the slide and related components herein disclosed. While the lower end of the plate 80 is provided with a slot 87 for accommodating therethrough a portion of the casing C, the slot 87 is of such a size as not to minimize the plate as a safety medium when the plate is in its lowered position as will be fully understood. The forward movement of the housing 30 towards the tool 75 may be limited by the adjustment of a stop screw 88 threaded in the bracket 38, the screw 88 functioning to engage the bed 25 and thus define the advanced position of the casing C with respect to the tool 75.

The tool 75 comprises a cylindrical hub 89 formed on its peripheral face with longitudinally extending slots 90 and with a bore 91 accommodating therein the drive shaft 66 of the motor 65, the tool being fixed to the shaft by a suitable nut 92 or other convenient fastening means whereby the tool is rotated in unison with the shaft. Disposed within the slots 90 are combs or shredding devices 93 each comprising a guttered plate or gully 94 formed with an intermediate web section 95 and spaced triangular end sections 96, the sections cooperating to define a channel or groove 97. When assembled within the slots 90 of the hub 89, the faces of each plate 94, constitute side, end, inner and outer faces with the outer face 98 being formed with openings 99 in which are disposed the shanks of spaced teeth 100. The teeth 100 are maintained within the plates by screws 101 threaded into the plates and extending against the teeth, removal or loosening of the screws 101 permits the teeth 100 to be readily replaced when desired. The ends of the plates are bored and have extending therethrough screws 102 which are threaded into the hub 89 to thus lock the plates to the hubs for rotation therewith over a circular path. Inasmuch as the teeth 100 of each comb are disposed in longitudinal spaced alignment, the slots 90 extend at an angle; for instance, ten degrees, to dispose the plates abaxially of the hub and thus stagger the teeth of each comb relative to those of the adjacent combs, whereby, to preclude circumferential grooving during tread removal. The shape of each comb is substantially identical and is such that the teeth remove the tread from the casing to conform to a desired contour, it being understood that the channel, between the outer ends of the sections 96, is of a sufficient width to accommodate tires of various transverse sizes within a limited range and that the casing may be moved axially with respect to the tool to effect desired shaping of the casing and tread removal therefrom.

In operation—assuming that the casing C has been mounted on the rim 58 and inflated thereon, roller 54 arranged within the slot 46, housing 30 disposed in its retracted or distal position with respect to the tool 75, and the casing C and tool 75 rotated by their respective motors 32 and 65—the housing 30 is advanced towards the tool 75 by actuation of the screw 39 thereby raising the plate 80 and moving the casing C into engagement with the tool 75. As the casing engages the tool 75, the teeth 100 serve to progressively remove the tread therefrom until advance of the casing towards the tool is precluded. It is to be noted that one of the ways on the guide 29 is provided with suitable scale 103 for cooperation with an indicator 104 on the housing to denote the degree of advance of the housing thus enabling the operator to accurately determine the thickness of the tread being removed from the casing. It will be apparent that when the apparatus is being continuously used with casings of varying tread thicknesses, the operator advances the housing in accordance with the scale, with the stop-screw 88 functioning to preclude over advance of the casing and possible destruction thereof. When the treads to be removed are of like thicknesses, the screw 88 is employed to limit the advance of the casing thus relieving the operator of the necessity of observing the scale. In many instances, it is desirable to remove that portion of the casing C constituting the margins of the tread to a greater extent than the central portion thereof and to accomplish this purpose the lever 52 is operated to effect lateral movement of the casing with respect to the tool. This operation also serves to effect cleaning of the tread portion of the casing from shredded particles and the like adhering thereto. When casings of one size or type are being operated upon, the roller 54 is positioned within the cam slot 47 and the lever 52 secured in fixed position on the housing by means of the keeper 55. When the lever 52 is thus connected to the member 45, the latter will reciprocate on the shaft 34 by reason of the cam slot 47, the swells therein serving to momentarily interrupt the reciprocating movement of the casing to effect a more gradual shredding of the tread along its margins without imposing an overload on the tool and resultant undesirable coarse shredding of the casing. When the tread has thus been removed from the casing and the latter shaped to accord with a predetermined contour, the housing is moved to its retracted position by reverse operation of the screw 39 whereupon the plate 80 is lowered to protect the operator from the tool. When the housing has thus been retracted, the collar 60 is disconnected from the pin 50 and removed from the sleeve 49 whereupon the outer section 57 of the rim is detached from the sleeve 49 and separated from the section 56 thus breaking the seal between the casing and rim and permitting removal of the casing, the air having been exhausted therefrom upon breaking of the seal. When the casing has thus been removed, another casing is similarly mounted for treatment by the tool 75, it being understood that the size and shape of the rim is such as to accommodate casings of various diameters within a limited range.

If desired, as illustrated in Figure 13, the combs may be provided with shanks 105 having elongated heads 106 disposed in end abutting relation throughout the length of the combs and formed on their outer surfaces with serrations or teeth 107 to effect shredding and removal of the tread.

In the modified form of tool disclosed in Figures 14 and 15 of the drawings, a hub 110 is provided on which is sleeved a plurality of canted discs 111 of varying diameters having circumferential faces formed with teeth 112 with the discs being separated by means of spacers 113 mounted on the hub. One end of the hub is provided with a collar 114 for engaging the adjacent discs while the opposite end of the hub has detachably mounted thereon a collar 115 engaging the adjacent disc and retained on the hub by a nut 116 carried by the hub. The hub is provided with a bore which accommodates therethrough a drive shaft for rotating the tool. The angularity of the discs 11 relative to the axis of the hub is such that teeth of adjacent discs are closely tracked during rotation of the tool, thus, eliminating relatively wide spacing between teeth of adjacent discs during rotation.

In the form of tool illustrated in Figures 16 to 19, inclusive, the hub 120 is formed with spaced longitudinally extending rows of sockets or openings 121 in which are positioned the shank ends of teeth 122 formed with conical outer ends 123. The teeth, adjacent the ends 123, are channeled as at 124 to provide seats or shoulders 125 within the confines of the sockets. The hub 120, adjacent the teeth 122, has threaded therein set-screws 126 having heads overlying and engaging the shoulders 125, whereby, to maintain the teeth within the openings and fixed to the hub. By removing the screws 126, the teeth may be replaced or removed and resharpened.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What I claim is:

1. In a casing tread removing apparatus, a support, a jack shaft slidably carried by said support, a casing mounting rim thereon, a tool shaft rotatably connected to said support, a tread removing tool mounted on said tool shaft and rotatable therewith, power means connected to each of said shafts for rotating said tool and said rim, manually actuated means connected to said jack shaft for moving said rim over a path towards said tool to effect engagement of the tread of a casing mounted on said rim with said tool for removing said tread from said casing during rotation of said tool and said rim, said rim including a pair of sections with one section being removable from the other to permit mounting and dismounting of said casing thereon and therefrom, respectively, a cam member slidably axially mounted on said jack shaft and rotatable therewith, said member being fixed to the other of said sections for movement therewith and provided with circumferential and cam slots, a pivoted lever equipped with a roller selectively disposed within said circumferential slot for reciprocating said rim on said jack shaft upon manual oscillation of said lever, said roller being removable from said circumferential slot for disposal in said cam slot for reciprocating said rim automatically on said jack shaft when said lever is maintained in a fixed position, said member serving to move said casing over a path angularly related to said first-mentioned path to dress said casing along the margins of said tread during removal of said tread and upon reciprocation of said member.

2. In a casing tread removing apparatus, a support, a housing slidably mounted on said support, a jack shaft journaled in said housing, a motor mounted in said housing and connected to said jack shaft for rotating the latter, a motor carried by said support in spaced relation to said housing and having a drive shaft, a tread removing tool mounted on said drive shaft and rotatable therewith, a feed screw swiveled to said support and connected to said housing for moving the latter over a path to and from said tool, a casing mounting rim having a pair of separable sections with one of said sections being removable from the other to permit mounting and dismounting of a casing thereon and therefrom, respectively, said other section having a hub slidably axially mounted on said jack shaft and rotatable therewith and provided with circumferential and cam slots, a lever pivoted to said housing and equipped with a roller selectively positioned within said circumferential slot for reciprocating said rim on said jack shaft upon manual oscillation of said lever, said roller being removable from said circumferential slot and positioned in said cam slot for reciprocating said rim automatically on said jack shaft when said lever is maintained in fixed position relative to said housing, said cam slot serving to move said casing over a path angularly related to said first-mentioned path to dress said casing along the margins of its tread during removal of said tread by said tool and upon reciprocation of said hub.

3. In a casing tread removing apparatus, a support, a housing slidably mounted on said support, a jack shaft journaled in said housing, a motor mounted in said housing and connected to said jack shaft for rotating the latter, a motor carried by said support in spaced relation to said housing and having a drive shaft, a tread removing tool mounted on said drive shaft and rotatable therewith, a feed screw swiveled to said support and connected to said housing for moving the latter over a path to and from said tool, a casing mounting rim having a pair of separable sections with one of said sections being removable from the other to permit mounting and dismounting of a casing thereon and therefrom, respectively, said other section having a hub slidably axially mounted on said jack shaft and rotatable therewith and provided with circumferential and cam slots, a lever pivoted to said housing and equipped with a roller selectively positioned within said circumferential slot for reciprocating said rim on said jack shaft upon manual oscillation of said lever, said roller being removable from said circumferential slot and positioned in said cam slot for reciprocating said rim automatically on said jack shaft when said lever is maintained in fixed position relative to said housing, said rim serving to move said casing over a path angularly related to said first-mentioned path to dress said casing along the margins of its tread during removal of said tread by said tool and upon reciprocation of said hub, a hood enclosing said tool and provided with an opening for receiving said casing when advanced into engagement with said tool, a guard mounted on said support in front of said opening and operatively connected to said housing, said guard being operated to a position fully exposing said opening upon advance of said housing towards said tool, an outlet conduit connected to said hood, and a suction device connected to said outlet conduit for discharging waste material out of said hood through said outlet conduit.

4. In a casing mounting device, a rotatable shaft, a mounting rim having a pair of separable sections with one of said sections being provided with a hub receiving said shaft for rotation therewith and said other section being sleeved on said hub, said sections having coacting rim portions for receiving a casing, an air inlet extending through one of said rim portions for supplying the casing with air, a gasket interposed between said sections to seal said air within said casing, a radially extending pin carried by said hub, a lock-collar detachably mounted on said hub and provided with a bayonet slot receiving said pin for locking said sections together for unitary movement, said lock-collar being removable from said hub to permit separation of said sections and removal of said other section from said hub to permit mounting and dismounting of said casing on and from said rim, respectively.

5. A casing tread removing apparatus comprising a support, a casing mounting means slidably and rotatably carried by said support for rotating the casing about the center of its circumference, a tool rotatably mounted on said support adapted to tangentially engage a casing on said mounting means, power means connected to said casing mounting means and said tool, actuating means connected to and extending to one end of said support for moving said mounting means over a path toward said tool to effect engagement of a casing mounted on said mounting means with said tool for removing the tread from said casing when said power means is rendered effective, reciprocating means connected to said mounting means and extending to said end of the support and effective for reciprocating said casing over a path angularly related to said first-mentioned path to dress said casing along the margins of said tread during removal of said tread, said reciprocating means comprising a lever pivoted at its inner end to said support, said lever having a pin extending into a circumferential slot on the mounting means.

6. A casing tread removing apparatus comprising a support, a casing mounting means slidably and rotatably carried by said support for rotating the casing about the center of its circumference, a tool rotatably mounted on said support adapted to tangentially engage a casing on said mounting means, power means connected to said casing mounting means and said tool, actuating means connected to and extending to one end of said support for moving said mounting means over a path toward said tool to effect engagement of a casing mounted on said mounting means with said tool for removing the tread from said casing when said power means is rendered effective, reciprocating means connected to said mounting means and extending to said end of the support and effective for reciprocating said casing over a path angularly related to said first-mentioned path to dress said casing along the margins of said tread during removal of said tread, said reciprocating means comprising a lever pivoted at its inner end to said support, said lever having a pin extending into a circumferential slot on the mounting means, and cam means selectively engageable by said lever to automatically effect said reciprocation of said casing with the rotation fo said casing mounting means.

7. A casing tread removing apparatus comprising a support, a casing mounting means slidably and rotatably carried by said support for rotating the casing about the center of its circumference, a tool rotatably mounted on said support adapted to tangentially engage a casing on said mounting means, power means connected to said casing mounting means and said tool, actuating means connected to and extending to one end of said support for moving said mounting means over a path toward said tool to effect engagement of a casing mounted on said mounting means with said tool for removing the tread from said casing when said power means is rendered effective, reciprocating means connected to said mounting means and extending to said end of the support and effective for reciprocating said casing over a path angularly related to said first-mentioned path to dress said casing along the margins of said tread during removal of said tread, said reciprocating means comprising a lever pivoted at its inner end to said support, said lever having a pin extending into a circumferential slot on the mounting means, said mounting means having a second circumferential slot selectively engageable by said pin on said lever when the lever is shifted to disengage said pin from the first slot, and means to locate said lever in said shifted position, whereby said reciprocation of said casing is automatically effected with the rotation of said casing mounting means.

References Cited in the file of this patent
UNITED STATES PATENTS

| | | |
|---|---|---|
| 2,333,599 | Terry | Nov. 2, 1943 |
| 2,636,277 | Hawkinson | Apr. 28, 1953 |
| 2,658,258 | Hawkinson | Nov. 10, 1953 |
| 2,697,252 | Clark | Dec. 21, 1954 |
| 2,704,122 | Watson | Mar. 15, 1955 |
| 2,813,328 | Tobey | Nov. 19, 1957 |